United States Patent
Bauersachs et al.

(10) Patent No.: US 9,180,642 B2
(45) Date of Patent: Nov. 10, 2015

(54) MACHINE BED, METHOD FOR THE OPERATION OF A FORMING MACHINE AND FORMING INSTALLATION

(75) Inventors: Lothar Bauersachs, Weidhausen (DE); Herbert Rüger, Schneckenlohe (DE)

(73) Assignee: LANGENSTEIN & SCHEMANN GMBH, Coburg (DE)

( * ) Notice: Subject to any disclaimer, the term of this patent is extended or adjusted under 35 U.S.C. 154(b) by 63 days.

(21) Appl. No.: 14/127,146

(22) PCT Filed: Jul. 24, 2012

(86) PCT No.: PCT/EP2012/064532
§ 371 (c)(1),
(2), (4) Date: Dec. 17, 2013

(87) PCT Pub. No.: WO2013/023888
PCT Pub. Date: Feb. 21, 2013

(65) Prior Publication Data
US 2014/0116104 A1    May 1, 2014

(30) Foreign Application Priority Data

Aug. 16, 2011 (DE) .......... 10 2011 052 733

(51) Int. Cl.
*B30B 15/04* (2006.01)
*B21J 13/04* (2006.01)
(Continued)

(52) U.S. Cl.
CPC .............. *B30B 15/042* (2013.01); *B21J 13/04* (2013.01); *B30B 15/00* (2013.01); *B30B 15/007* (2013.01); *B30B 15/0094* (2013.01);
(Continued)

(58) Field of Classification Search
CPC .. B30B 15/00; B30B 15/0094; B30B 15/007; B30B 15/042; B21J 13/04; E02D 27/44; F16M 1/02; F16M 5/00; B23Q 1/015; B23Q 1/037; B23Q 11/0014; B23Q 11/0025; B23Q 11/001
USPC .................. 72/21.4, 455–454, 453.01, 465.1, 72/453.02; 100/258 A, 35; 29/452; 248/575, 678–679
See application file for complete search history.

(56) References Cited

U.S. PATENT DOCUMENTS 3,581,656 A * 6/1971 Pappas et al. ................. 100/214
3,800,636 A    4/1974 Zagar
(Continued)

FOREIGN PATENT DOCUMENTS

CH         363315 A    7/1962
CN     101982251 A    3/2011
(Continued)

OTHER PUBLICATIONS

International Application No. PCT/EP12/64532 International Preliminary Report on Patentability Dated Feb. 18, 2014 (8 Pages).

*Primary Examiner* — Peter DungBa Vo
*Assistant Examiner* — Joshua D Anderson
(74) *Attorney, Agent, or Firm* — Keller Jolley Preece

(57) ABSTRACT

The invention relates in particular to a machine bed for hydraulic presses. The machine bed has a bed body and at least one pretensioning unit. The pretensioning unit is realized in such a manner and cooperates with the bed body in such a manner that said bed body is acted upon by lateral pretensioning.

20 Claims, 2 Drawing Sheets

(51) Int. Cl.
   *B30B 15/00*   (2006.01)
   *E02D 27/44*   (2006.01)
   *B23Q 11/00*   (2006.01)

(52) U.S. Cl.
   CPC .............. *B30B 15/04* (2013.01); *E02D 27/44* (2013.01); *B23Q 11/0014* (2013.01)

(56) References Cited

U.S. PATENT DOCUMENTS

| | | | |
|---|---|---|---|
| 3,884,142 | A | 5/1975 | Jonsson |
| 3,911,811 | A | 10/1975 | Adolfsson |
| 5,115,663 | A * | 5/1992 | Ando et al. ................. 72/369 |

FOREIGN PATENT DOCUMENTS

| | | |
|---|---|---|
| DE | 2449256 A1 | 7/1962 |
| DE | 1 223 663 B | 8/1966 |
| DE | 2043675 | 9/1970 |
| GB | 2070510 | 2/1981 |
| JP | 50-112868 | 9/1975 |
| JP | 02-089524 | 3/1990 |
| JP | 06-269894 | 9/1994 |
| JP | 09-510145 | 10/1997 |
| JP | 2000-212998 | 2/2000 |
| JP | 2004-249351 | 9/2004 |
| NL | 265271 A | 6/1964 |

\* cited by examiner

MACHINE BED, METHOD FOR THE OPERATION OF A FORMING MACHINE AND FORMING INSTALLATION

CROSS-REFERENCE TO RELATED APPLICATIONS

This application is a national phase entry under 35 U.S.C. §371 of International Application No. PCT/EP2012/064532, filed Jul. 24, 2012, which claims the benefit of German Application No. 10 2011 052 733.8, filed Aug. 16, 2011. The entire contents of each of the foregoing patent applications are hereby incorporated by reference.

BACKGROUND OF THE INVENTION

1. Field of the Invention

The invention relates in particular to a machine bed for forming machines, in particular hydraulic presses.

2. Background and Relevant Art

Beds and bed structures, in particular of reinforced concrete, for machines are adequately known. In the case of machines such as forming machines, e.g. hydraulic presses, during operation considerable forces act on the beds on which said machines are mounted. Said forces can impair, among other things, the stability and strength of the beds and in this way can reduce the service life of the bed.

BRIEF SUMMARY OF THE INVENTION

It is the object of the invention to eliminate the disadvantages according to the prior art. In particular, a machine bed for forming machines, in particular hydraulic presses, with improved longevity and long-term stability are to be provided. Looked at from the same standpoints, in addition a method for the operation of a forming machine mounted on the machine bed is to be provided as well as a forming installation.

This object is achieved in particular by claims 1, 10 and 12. Developments are produced from the dependent claims.

A machine bed for a forming machine, in particular a machine bed for hydraulic presses, is provided according to claim 1. The bed comprises a bed body with a support surface for supporting a, preferably hydraulic, forming device of the forming machine. In addition, the machine bed comprises at least one pretensioning unit. The at least one pretensioning unit is realized and cooperates with the bed body in such a manner that the bed body is acted upon by lateral pretensioning which reacts to an input of force into the bed body brought about by and during the operation of the forming device.

The term pretensioning and related concepts are to refer to tension or distortion of the machine bed, definitively of the bed body, which is generated by the pretensioning unit provided precisely for this purpose. Tensions and distortions which are generated in another manner, for example, merely by mounting the machine on the machine bed, are not to be seen as pretensioning.

With pretensioning as proposed, in particular lateral pretensioning, of the bed body, it is possible to react to forces which act on the bed body during the operation of a machine, for example a hydraulic press, mounted on the bed body. Consequently it can be achieved that forces acting on the bed body during the operation of a machine are distributed and conducted away in an advantageous manner. All in all, improved longevity and long-term stability of the machine bed can consequently be achieved.

The lateral pretensioning, in this case, can be generated in such a manner that said lateral pretensioning acts in at least one layer or plane which is parallel to a machine base of the bed body, preferably in a ground-side bed plate and/or in bed walls which extend per se from the bed plate.

In this case, the term machine base is to refer in particular to that side, say surface, in particular axial surface, of the bed body on which the forming machine is arranged and is at least in part supported, in particular mounted and installed. In so far as the bed body, for instance on account of structural conditions of the forming machine, has no contiguous machine base, but rather several separate, in particular axial, individual bases and/or the forming machine is supported on several individual bases placed in different planes, the machine base can and is to be understood as a plane or layer which comprises the individual bases.

The term lateral pretensioning is to refer to lateral pretensioning of the bed body which is generated by forces acting on the bed body from outside and/or by forces generated within the bed body and acting thereon. In this connection, the term "lateral" is to refer in particular to the effect that the forces acting to generate the lateral pretensioning act on surfaces or layers oriented or placed parallel to the machine base or to the ground-side bed plate of the machine bed.

The bed body can be in particular a cylindrical bed, i.e. a bed which is circular in axial section and/or a circular bed. As a cylindrical bed, the bed body can be realized in particular as a solid bed, or, in a preferred manner, as a cup bed or a ring bed. A cup bed can have, for example, a ground-side, in particular circular or oval-shaped, laterally continuous bed plate and one or more bed walls which extend therefrom. In axial section, i.e. lateral section, the bed wall/walls is/are preferably realized and/or arranged in a circular manner. In this case, the bed walls can encircle the bed plate completely. However, it is also possible, depending on the conditions of and demands on the mounting and the operation of the forming machine to be installed on the machine bed, for several bed walls to be provided spaced apart from each other by gaps. According to demand, the bed wall or bed walls can have recesses, passages etc., for example for supplying and/or removing workpieces to be formed etc. Where applicable, also according to demand, a bed cover or bed part cover can be provided on the bed wall or the bed walls, for example as a covering for systems mounted underneath it and/or as a base or mounting surface for additional machines and components.

In particular in the case of cup beds, the support surface can be realized at least in part on an inner radial surface of the bed body. An inner radial surface can be realized for example on an inside surface of a bed wall.

Bed bodies with the aforementioned geometries and forms can be produced in a comparatively cost-efficient manner, and, with regard to stability, are particularly suited for forming machines. The forces acting on the bed body can be distributed in a particularly even manner for the mentioned bed forms, which results in a reduction in the inner stress of the bed body. Consequently, particularly advantageous service lives and long-term stability can be achieved.

As already mentioned, the bed body is preferably produced from concrete, in particular reinforced concrete. It is to be mentioned in this connection that the advantage of the named geometries with concrete beds is that the inner stress on the bed body caused by hydration heat, which is generated when the concrete hardens, is less in comparison with other forms and geometries.

According to one development, the pretensioning unit comprises first pretensioning elements which extend externally of the bed body, in particular laterally of the bed body, in particular encircling the bed body in a lateral manner. In the case of a round configuration of the bed body, the first pretensioning elements can extend radially along an outside surface of the bed body, for example in one or several windings. The first pretensioning elements can be rings, belts and/or cables. The pretensioning elements are preferably produced of steel and/or of other materials, in particular of a similar strength, in particular of a similar tensile strength.

According to a further development, the tensioning unit comprises internal second pretensioning elements, which in particular are embedded at least in part into the bed body. The second pretensioning element can be for example steel cables or belts, which extend embedded at least in part in the bed body. It is particularly advantageous when the second pretensioning elements extend in the bed plate of the bed body.

The second pretensioning elements can be embedded with or without bonding in the bed body, the second pretensioning elements extending loosely in the bed body in the case of the development without bonding. In the case of loosely embedded second pretensioning elements, ends or end regions are fixed on or in the bed body by means of corresponding anchors, regions of the second tensioning elements extending away from the anchors being guided in pipes, corrugated pipes, sleeves and the like, such that when the bed body is produced, with the exception of the anchors or in the anchor region, no bond is able to be generated, for example with the concrete.

In a preferred manner, the second pretensioning elements extend in the bed plate of the bed body. It is particularly advantageous when the second pretensioning elements extend along lines which extend approximately through the centre of the bed body, in particular of the bed plate. In the case of cylindrical bed bodies, the second pretensioning elements can extend in an approximately radial direction, in particular along the diameter. It is also possible for second pretensioning elements to extend along lines which run parallel to lines through the centre. In the case of circular bed bodies, said lines are secants which run parallel to a median line of the bed body. Second pretensioning elements can also run in another arbitrary manner in the bed body, for example approximately along circles, ellipses, etc.

Two or several of the second pretensioning elements can be guided in the bed body so as to be parallel and/or to be crosswise to each other. In the case of a circular bed body, a first group of second pretensioning elements can run along parallel first secants. A second group of second pretensioning elements can run along parallel second secants, which run transversely, in particular perpendicular with respect to the first secants.

So-called "post-tensioning" can be particularly advantageous, i.e. the first and/or second pretensioning elements are realized in such a manner that the pretensioning can be generated and/or adjusted subsequently, i.e. after the bed body has been completed, in the case of a concrete bed once the concrete has hardened. In this case it is possible in particular that the pretensioning of the bed body can be adjusted, in particular modified, dynamically once it has been finished corresponding to respective conditions and boundary conditions.

For example, with post-tensioning it is possible to adjust the pretensioning of the bed body in dependence on and corresponding to respective operating parameters of the machine mounted on the bed body. To this end, the pretensioning unit can comprise a, in particular hydraulic, pretensioning device which cooperates with the first and/or second pretensioning elements and is realized for the, in particular dynamically, modifiable adjustment of the pretensioning of the bed body brought about by the pretensioning elements. In an advantageous manner, the pretensioning unit is realized in such a manner that the pretensioning can be adjusted corresponding to the respective demands directly prior to and/or even during the execution of one or more operating cycles of the forming machine, in particular of one of the forming devices.

According to a further development, the pretensioning unit can additionally have a control means which cooperates with the pretensioning device. The control means can be realized for the, in particular dynamically, modifiable adjustment of the pretensioning of the bed body. In this case, it is possible that the control means has access to operating parameters, in particular machine programs, of a machine mounted on the bed body, and that the control means adjusts the pretensioning in dependence on at least one operating parameter of the machine. By means of a dynamic adjustment of this type, the optimum or most favourable lateral pretensioning in each case can be set for the bed body for individual operating phases.

According to a particularly preferred development, the bed body is acted upon by lateral pretensioning in such a manner that said bed body has a curvature. In a preferred manner, the curvature is realized in such a manner that a concave curvature is produced with regard to a mounting surface which is realized for the mounting of the forming device, i.e. in the region or on the side of the machine base/bases. In the case of dynamic adjustment of the pretensioning, the curvature of the bed body can be adjusted or changed, according to demand. In particular, the curvature can be adjusted in dependence on respective operating states or operating phases of the machine. In this way, unnecessary stresses on the bed body can be avoided, at least however reduced.

The aforementioned curvature can be achieved in particular by all the first and/or second pretensioning elements, in a preferred manner however the second tensioning elements, being arranged between the mounting surface, in particular the machine base/bases and the elastic line of the bed body. This should mean that the first and/or second pretensioning elements extend in a layer of the bed body running between the machine base and the elastic line. In a preferred manner, the first and/or second pretensioning elements extend comparatively close, i.e. at a comparatively small spacing to the machine base, in particular in the upper third or upper quarter of the bed plate of the bed body, for example at approximately 75% of the height of the bed plate of the bed body when measured from below or 25% when measured from above.

According to claim 10, a method is provided for the operation of a forming machine, in particular a hydraulic press, on a machine bed as afore-described, including all developments of the same. In the case of the method, the lateral pretensioning of the bed body is adjusted or modified in dependence on operating parameters of the machine. The adjustment or modification of the lateral pretensioning can be effected in particular prior to, e.g. immediately prior to, and/or during the operation of the forming machine. In a preferred manner, the adjustment of the lateral pretensioning is effected in a dynamic manner, i.e. in dependence on dynamically changing operating parameters of the forming machine and/or interactions between the forming machine and the bed body. By means of lateral pretensioning adapted to respective operating states and operating phases, stresses caused by the operation of the machine and detrimental to the stability and longevity of the bed body can at least be reduced.

In the case of the method, it is possible in one development for respective, i.e. relevant to the optimum adjustment of the pretensioning, operating parameters of the machine to be transmitted to the electronic control means. This can be effected in that the machine itself, preferably a machine control means, provides the operating parameters and/or sends them to the control means. It is also possible for the control means to call up the operating parameters from the machine, for example from a machine control means. Operating parameters and/or interactions between the forming machine and the bed body can also be determined for example or as an alternative by way of sensors, or can be held in, in particular electronically stored, tables.

By way of the operating parameters transmitted or made known in another manner, the electronic control means controls the pretensioning device in such a manner that the pretensioning of the bed body is adjusted in a corresponding manner, in particular in a predetermined manner for the respective operating parameters and/or interactions. The pretensioning to be set for an operating parameter and/or an interaction, in this case, can be fixedly predetermined. However, it is also possible for the necessary pretensioning in each case not to be determined, in particular calculated until the operating parameters and/or interactions are known. The determining or calculating, in this case, can be effected by the electronic control means of the pretensioning unit. Operating parameters or operating state variables of the machine and/or interactions, as already mentioned, can also be detected and/ or called up by sensors, in particular by means of sensors embedded into the bed body, and the like, for example forces and/or accelerations.

According to claim 12, there is provided a forming installation which has a machine bed as described further above, on which machine bed a forming machine is supported, in particular is mounted. Reference is made to the above designs on account of the advantages and advantageous effects.

In one development of the forming installation, the forming machine can comprise a forming device with several forming elements, in particular hydraulic cylinders, which are arranged in one or several lateral planes, i.e. axial planes. Forming elements can be arranged in pairs, with effective directions which are directed opposed to each other or in parallel. For example, first forming elements can be provided for the axial stretching and/or upsetting of a component to be formed. Second forming elements can be realized to deform the component or workpiece to be formed perpendicularly with respect to its axial direction.

In one development of the forming machine, the forming elements have effective directions which are opposed to each other and/or extend transversely, preferably offset by an angle of 90 degrees, with respect to each other. In particular the forming elements can be provided in an arrangement where the pairs extend crosswise.

The machine bed, the method and the forming installation are suited in particular for forming machines realized and set up to produce crankshafts for ship's engines.

BRIEF DESCRIPTION OF THE DRAWINGS

Exemplary embodiments of the invention are described below by way of the attached Figures, in which, in detail.

DETAILED DESCRIPTION

Figure 1:
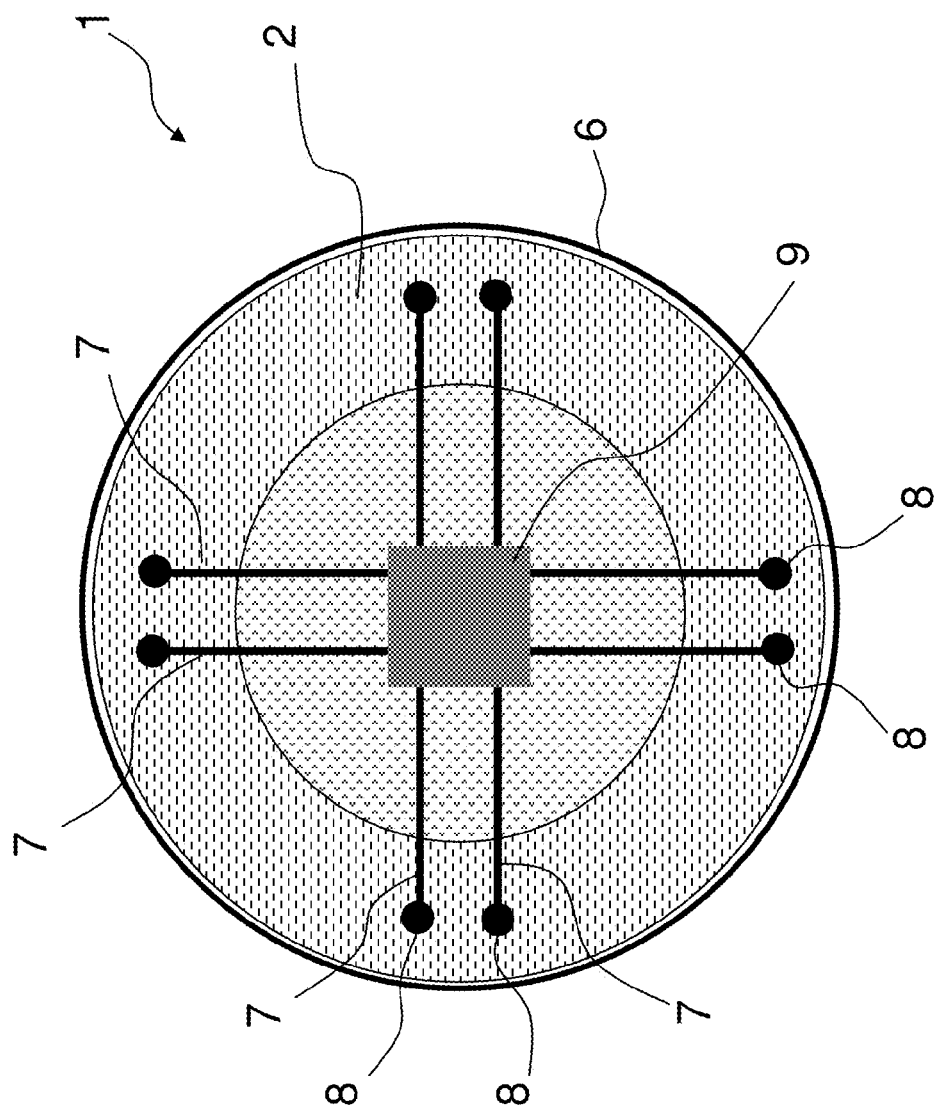
FIG. 1 shows a top view onto a machine bed.
Figure 2:
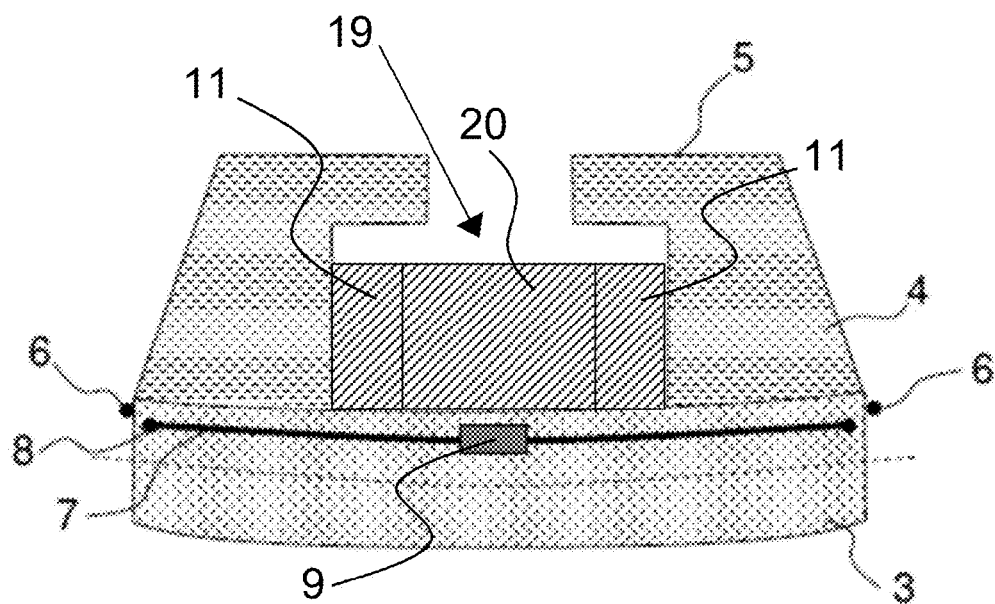
FIG. 2 shows a cross-sectional view of the machine bed.

FIG. 1 shows a top view onto a machine bed 1 for a hydraulic press. The machine bed, the bed 1 below in short, comprises a bed body 2. FIG. 2 shows a cross section through the machine bed 1.

The bed body 2 produced from concrete or reinforced concrete, in the present case, is in the form of a cup-shaped cylindrical bed, and comprises a base plate 3, i.e. a bed plate, with cup-shaped walls 4 connecting thereto, which can be seen in particular from FIG. 2.

The cup-shaped walls 4 in FIG. 2 extend from a machine base 5 of the base plate 3 upward. The cup-shaped walls 4 are realized in the present case in a ring-shaped manner.

The machine bed 1 additionally comprises a pretensioning unit. The pretensioning unit comprises first pretensioning elements 6 which extend outside the bed body 2 and are realized as encircling cables, belts or rings of steel. FIG. 2 simply shows one winding of a first pretensioning element 6. However, it is also possible for several windings of first pretensioning elements 6 to be present. The bed body 2 is acted upon with lateral pretensioning by means of the first pretensioning elements 6. In definitive terms, corresponding tensioning of the first pretensioning elements produces a force directed in the lateral direction onto the bed body 2.

The pretensioning unit additionally comprises several second pretensioning elements 7 guided in the bed body 2. The second pretensioning elements 7 in the present case, in total four, are arranged in each case in pairs and extend in directions that intersect each other. The second pretensioning elements 7 extend, in the present case, along secants of the bed 1.

The second pretensioning elements 7 are fixed at their ends in the bed body 2, more precisely in the base plate 3, by way of corresponding fastening anchors 8. The second pretensioning elements 7, which in this case are steel cables, are embedded loosely, i.e. with no fixed bond to the base plate 3, extending away from the fastening anchors 8. In definitive terms, the second pretensioning elements 7 extend in corrugated pipes of metal, in particular steel, which prevent a bond between the steel cable and the concrete of the base plate 3.

The second pretensioning elements 7 are connected in pairs each to a pretensioning device 9 of the pretensioning unit. The pretensioning devices 9, in the present case, are arranged in the region of the fastening anchors 8 and are realized and set up in such a manner that said pretensioning devices can modify in a dynamic manner the lateral pretensioning brought about on the bed body 2 by the second pretensioning elements 7, in particular after the completion of the bed 1. In so far as necessary, further pretensioning devices can be provided in the region of the remaining fastening anchors 8.

The pretensioning device 9, in this case, is a hydraulic pretensioning device 9, which comprises an electronic control means (not shown) for adjusting the lateral pretensioning. The adjusting of the lateral pretensioning, in this case, can be effected in particular in dependence on operating parameters or operating states of a hydraulic press mounted on the bed body 2. Using the pretensioning device 9, the pretensioning can be modified in a dynamic manner, i.e. in particular even during the operation of the hydraulic press such that the pretensioning is able to be adapted in a quasi continuous manner to changing operating states or operating parameters etc.

The hydraulic press comprises a forming region, with forming tools which are coupled to forming elements 11 (e.g., hydraulic cylinders 11). FIG. 2 shows—simply by way of example and without any further description of the detail—support struts, by way of which the hydraulic cylinders 11 and where applicable further components of the forming region are supported on the machine base 5. The hydraulic cylinders 11, as can be seen in particular from FIG. 2, are supported on radial support surfaces on the inside surfaces of the cup-shaped walls 4. Forces occurring during the operation of the hydraulic cylinders 11 are introduced into the machine bed 1 by means of the support surfaces 1.

In the case of the forming machine 19 (e.g., a hydraulic press) and forming device 20 shown, in each case two hydraulic cylinders 11 are arranged in a collinear manner with respect to each other with opposed effective directions. Two such pairs of hydraulic cylinders are arranged in each case parallel to each other. The hydraulic cylinder pairs are arranged all in all crosswise with respect to each other, more precisely offset by 90 degrees, i.e. two hydraulic cylinders pairs are arranged crosswise with respect to further two hydraulic cylinder pairs. The hydraulic cylinders 11 are arranged and realized in such a way and cooperate with forming tools in such a manner that a workpiece to be formed can be upset and/or stretched in its axial direction, and that the workpiece can be deformed in a direction perpendicular to its axial direction, in particular penetrated by press tools. The workpiece can be, for example, a rod-shaped workpiece for a crankshaft of a ship's engine.

So that the workpiece is able to be supplied to the forming region, the machine bed 1, in particular the cup-shaped wall 4 or the cup-shaped walls 4, can have suitable recesses or cutouts. With regard to the machine bed 1 shown in FIG. 2, it must be mentioned again that said machine bed has bed part covers connecting to the cup-shaped wall 4, by way of which part covers the forming region can be housed at least in part. The substantially radially inward-pointing bed part covers are realized in the present case in the form of projections or protrusions and are also able to be used to accommodate and support further components.

The bed 1 shown in FIGS. 1 and 2 is pretensioned in such a manner that the bed body 2, in particular the base plate 3, has a concave curvature with regard to the side of the machine base 5. In order to achieve this, the second pretensioning elements 7, and also the first pretensioning elements 6, are arranged above the elastic line. Particularly advantageous force distribution and force introduction into the bed 1 can be achieved with a concave curvature. In particular, the forces which are caused by the hydraulic cylinders 11 during the forming of the workpiece and which are introduced into the machine bed 1 by means of the support surfaces, are able to be distributed in an optimum manner and be compensated at least to a suitable extent.

By way of example, the bed 1 can have the following dimensions. The overall diameter of the bed 1, in particular of the base plate 3 can be 25 m. The inside diameter of the cup-shaped portion of the bed 1 can be approximately 12 m. The height of the overall bed can be up to 9 m, it being possible for the height of the base plate 3 to be up to 5 m and the height of the cup-shaped portion to be up to 4 m.

Concrete of the C40/50 compressive strength class can be used, for example, for the bed 1. The first 6 and/or second pretensioning elements 7 are able to generate in particular pretensioning in the region of the maximum occurring pressure force or even slightly thereabove.

The proposed bed 1 is particularly long-lived and stable in the long term in particular on account of the possibilities for pretensioning the base body 2.

LIST OF REFERENCES

1 Machine bed
2 Bed body
3 Base plate
4 Cup-shaped wall
5 Machine base
6 First pretensioning element
7 Second pretensioning element
8 Fastening anchor
9 Pretensioning device
10 Forming region
11 Hydraulic cylinder
12 Workpiece
13 Bed part cover
14 Elastic line

We claim:

1. A machine bed for a forming machine, said machine bed comprising a bed body with at least one support surface for supporting at least one forming device of the forming machine, the bed body comprising a bed plate with a ground side, a continuous surface and at least one bed wall which extends axially therefrom, said machine bed further comprising at least one pretensioning unit, said at least one pretensioning unit cooperates with the bed body in such a manner that said bed body is acted upon with lateral pretensioning which reacts to an input of force into the bed body brought about by and during the operation of the forming device and brought about by the operation of the forming device,
   wherein the at least one pretensioning unit comprises first pretensioning elements which extend laterally on and along an outer surface of the bed plate of the bed body,
   wherein the at least one pretensioning unit further comprises at least two internal second pretensioning elements which are embedded at least in part into the bed body, said at least two internal second pretensioning elements are guided in the bed body so as to be crosswise to each other,
   wherein the second pretensioning elements are arranged parallel to the continuous ground side surface of the bed plate;
   wherein both the first pretensioning elements and the second pretensioning elements are arranged to act on the bed body with lateral pretensioning in a plane parallel to the continuous ground side surface of the bed plate.

2. The machine bed according to claim 1, wherein the bed body is a cylindrical bed, and wherein the at least one support surface is formed on an inner radial surface of the bed body.

3. The machine bed according to claim 1, wherein the bed body is produced from concrete.

4. The machine bed according to claim 1,
   wherein the internal second pretensioning elements extend along a line approximately through a centre point of the bed body.

5. The machine bed according to claim 4,
   wherein the pretensioning unit comprises a pretensioning device which is connected to one or more of the first or second pretensioning elements to provide modifiable adjustment of the lateral pretensioning of the bed body brought about by the pretensioning elements.

6. The machine bed according to claim 5,
   wherein the pretensioning unit has an electronic control means which cooperates with the pretensioning device and allows for control of the modifiable adjustment of the lateral pretensioning of the bed body.

7. The machine bed according to claim 5, wherein the pretensioning device is a hydraulic pretensioning device.

8. The machine bed according to claim 7, wherein the modifiable adjustment is in dependence on operating parameters of:
   the forming machine, or
   the forming device mounted on the bed body.

9. The machine bed according to claim 1, wherein the bed body is acted upon by lateral pretensioning in such a manner that said bed body has a curvature.

10. A method for the operation of a forming machine on a machine bed according to claim 9, wherein the lateral pretensioning of the bed body is adjusted in dependence on one or more of:
operating parameters of the forming machine;
in dependence on interactions between the forming machine and the bed body.

11. The method according to claim 10, wherein one or several respective operating parameters of the forming machine are transmitted to the electronic control means, and the electronic control means controls the pretensioning device in such a manner that lateral pretensioning of the bed body which is predetermined or determined for the respective operating parameter or parameters is set.

12. The machine bed according to claim 1, wherein the forming machine is a hydraulic press and wherein the forming device is a hydraulic forming device.

13. The machine bed according to claim 12, wherein the curvature is concave with regard to a mounting surface for the mounting of the forming machine.

14. The method according to claim 12, wherein the lateral pretensioning of the bed body is dynamically adjusted in dependence on one or more of:
operating parameters of the forming machine; or
interactions between the forming machine and the bed body.

15. The machine bed according to claim 1, wherein the bed body is a cup-shaped bed, and wherein the at least one support surface is formed on an inner radial surface of the bed body.

16. The machine bed according to claim 1, wherein the bed wall is ring-shaped in an axial section or is arranged in a ring-shaped manner and wherein the at least one support surface is formed on an inside surface of the bed wall.

17. A forming installation, comprising a machine bed according to claim 16 and a forming machine which is supported on the machine bed.

18. The forming installation according to claim 17, wherein a forming device of the forming machine comprises forming elements which are arranged in one or several axial planes.

19. The forming installation according to claim 18, wherein the forming elements are opposed to each other or arranged offset by 90 degrees with respect to each other.

20. The machine bed according to claim 1, wherein the first pretensioning elements comprise one or more of rings, belts or cables.

* * * * *